United States Patent [19]

Fisher et al.

[11] Patent Number: 4,518,360

[45] Date of Patent: May 21, 1985

[54] DEVICE TO COMPENSATE FOR DISTORTION IN TARGET LOCATION IN A VISUAL SYSTEM

[75] Inventors: Robert A. Fisher, Endicott; David L. Peters, Whitney Point, both of N.Y.

[73] Assignee: The Singer Company, Binghamton, N.Y.

[21] Appl. No.: 531,099

[22] Filed: Sep. 12, 1983

Related U.S. Application Data

[63] Continuation of Ser. No. 276,225, Jun. 22, 1981, abandoned.

[51] Int. Cl.³ .............................................. G09B 9/00
[52] U.S. Cl. ........................................ 434/20; 434/43; 434/22
[58] Field of Search ................................ 273/310–313, 273/DIG. 28; 434/20–22, 43; 340/705, 712, 890

[56] References Cited

U.S. PATENT DOCUMENTS 4,209,255  6/1980  Heynau et al. ..................... 434/43
4,395,045  7/1983  Baer .................................... 434/20

Primary Examiner—Richard C. Pinkham
Assistant Examiner—Leo P. Picard
Attorney, Agent, or Firm—Douglas M. Clarkson

[57] ABSTRACT

Improved marksmanship scoring device for use in weapons simulation. The apparatus compensates for equipment errors that prevent a marksmanship device from providing an accurate indication of a firearm hit or miss. To this end, a visual system (16), which includes an image generation subsystem (20) and an image display subsystem (22), is associated with a marksmanship scoring device. The invention provides correction apparatus which comprises a series connection of the visual system (16) with a photo sensor (24), an amplifier (26), a counter (28) and a comparator (30).

21 Claims, 10 Drawing Figures

RASTER SPACE & RASTER TIME

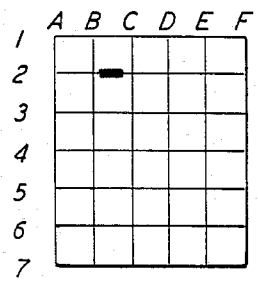
FIG. 1A
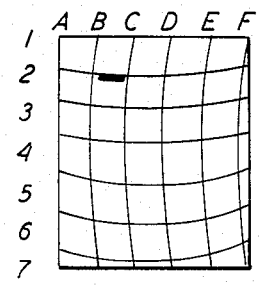
FIG. 1B
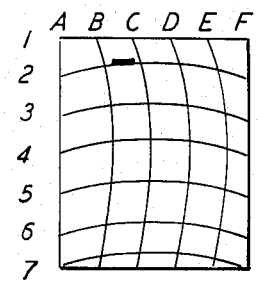
FIG. 1C
CRT VIEWING SURFACE
FIG. 1
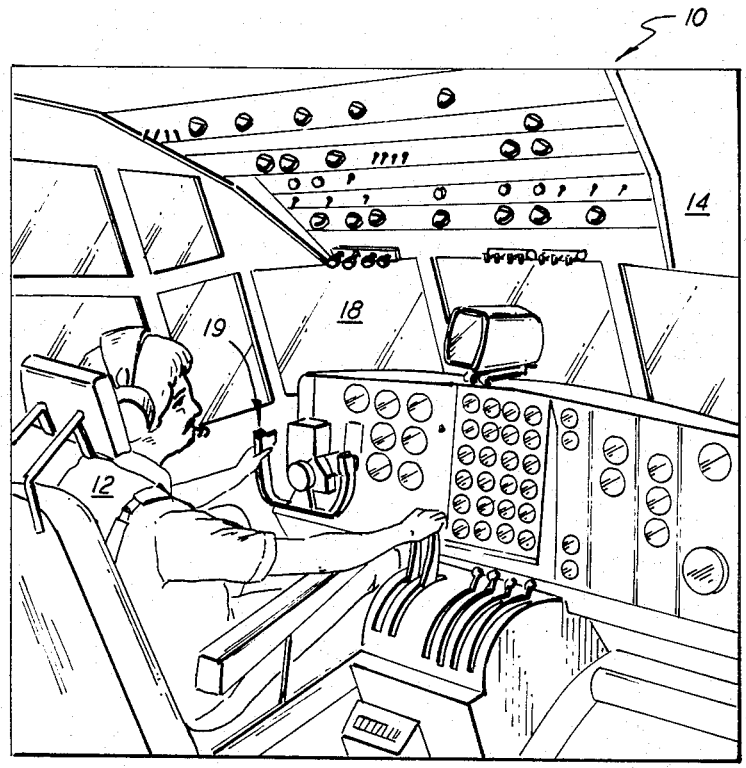
FIG. 2

U.S. Patent May 21, 1985 Sheet 2 of 3 4,518,360
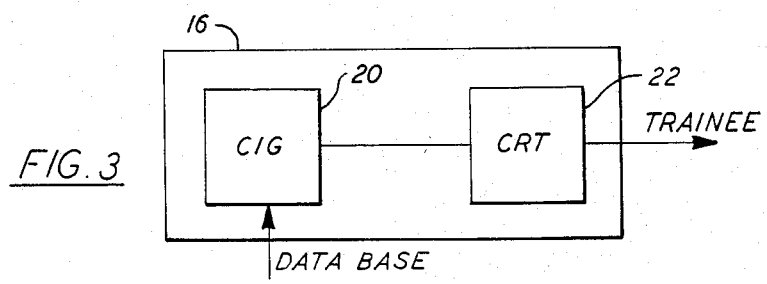
FIG. 3
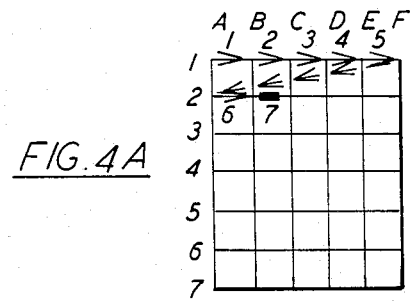
FIG. 4A
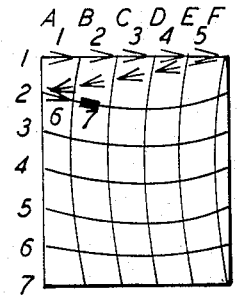
FIG. 4B
FIG. 4
RASTER SPACE & RASTER TIME
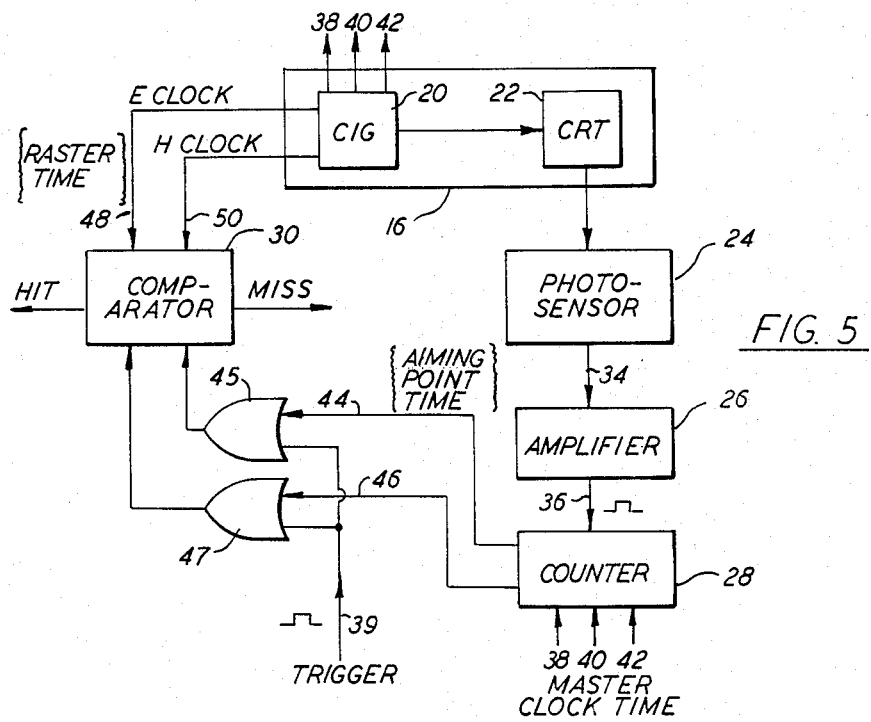
FIG. 5
B-4404

DEVICE TO COMPENSATE FOR DISTORTION IN TARGET LOCATION IN A VISUAL SYSTEM

This is a continuation of application Ser. No. 276,225, filed June 22, 1981, now abandoned.

TECHNICAL FIELD

The present invention relates to training devices and more particularly, to a marksmanship scoring device for use in flight simulation with provisions for evaluating equipment errors so that accurate scoring may be provided.

BACKGROUND ART

In order to maximize training capabilities, a flight simulator may provide a marksmanship scoring device that is associated with a visual system.

A visual system includes an image generation subsystem, e.g. a computer image generator (CIG), combined with an image display subsystem. In one display subsystem, a raster scanned television display is employed to generate an out of the window view. The external environment seen by the trainee pilot as he looks out the window is produced as the beam of the television cathode ray tube (CRT) traces the raster across the CRT's viewing surface.

The CRT is normally presented to the pilot through an optical system that provides a collimated view. The optical system normally will distort the image to a small degree, and the distortion will vary with head position.

The normal helmet-mounted sight is used in conjunction with the pilot's head angle to aim weapons at a target. The helmet-mounted sight has a predictable aiming tolerance, and the pilot must keep his sight on the target within the normal system tolerance. The addition of the optical system (and other system errors that do not admit to being calibrated) adds additional error to the aiming record of the pilot. Modern simulators must eliminate these additional errors if correct pilot training and scoring is to be accomplished.

The scoring device associated with the visual system operates on the principle that if a simulated firearm is properly aimed at a target, an indication of a hit is recorded. To this end, an image of a target may be provided by the CIG and traced onto the CRT by a target projection unit. A gun-sighting unit, using a helmet mounted sensor (HMS), is aimed at the target. The gun sighting unit may be electrically synchronized with the target projection unit. An error measuring device, which is electrically responsive to the movement of the sighting unit, produces a voltage representative of any error between the trainee's aiming point and the projected image of the target. In this way, the marksmanship of the trainee is scored by recording the number of hits.

To obtain a desired realism, the visual system-scoring device combination should anticipate and compensate for equipment errors that tend to critically detract from the realism of the simulator. Equipment errors include, for example, scanline non-linearities or collimation errors. These equipment errors are manifest as distortions in the scanline, evidenced by comparing the ideal scanlines shown in FIG. 1A with the distorted scanlines shown in FIG. 1B or 1C.

It is observed from these figures that if the trainee relied on the above stated principle underlying the prior art scoring devices, namely that if the simulated firearm were properly aimed at a target, an indication of a hit would be recorded, the equipment errors would cause an accurate shot to be falsely scored as a miss.

Relevant prior art devices, as typified by U.S. Pat. No 3,849,910 entitled "Training Apparatus For Firearms Use" which issued Nov. 26, 1974 to R. B. Greenley, have not addressed the problem of equipment errors as related to marksmanship scoring devices. These devices therefore lack realism relative to an actual shooting situation.

The present invention provides an apparatus for correction of equipment errors that addresses the cited problems and improves upon the prior art by compensating for equipment errors while preserving all of the attributes of the prior art approaches. The present invention thus provides a visual system-scoring device combination which mitigates the disadvantages of the prior art devices and enhances the effective realism of the simulator.

THE DISCLOSURE OF THE INVENTION

Accordingly, a primary object of the present invention is to provide a marksmanship scoring device which overcomes or mitigates the problems of the prior art as outlined above.

Another object of this invention is to provide such a scoring device that compensates for equipment errors, thereby providing a trainee with realistic training cues.

These and other objects may be accomplished according to the present invention in a marksmanship scoring device associated with a visual system that includes an image generation subsystem and an image display subsystem. The improvement comprises means for locating a target with respect to the generation subsystem and means for locating an aiming point in the image display subsystem with respect to the image generation subsystem. Finally, comparison means are provided to compare the locations of the target and aiming point.

BRIEF DESCRIPTION OF THE DRAWINGS

These and other features of the present invention will be more clearly understood from a consideration of the following description taken in connection with the accompanying drawings in which:

FIG. 1A is an idealized schematic that illustrates nondistorted scan lines traced onto a CRT;

FIGS. 1B and 1C illustrate distortions of the scan lines traced onto the CRT due to equipment error;

FIG. 2 shows a generalized view of the interior of a flight simulator;

FIG. 3 is a block diagram illustrating a visual system that may be associated with a marksmanship scoring device;

FIGS. 4A and 4B show a grid used to define raster space and raster time;

FIG. 5 is a block diagram of a preferred embodiment of the present invention;

BEST MODE FOR CARRYING OUT INVENTION

Figure 6:
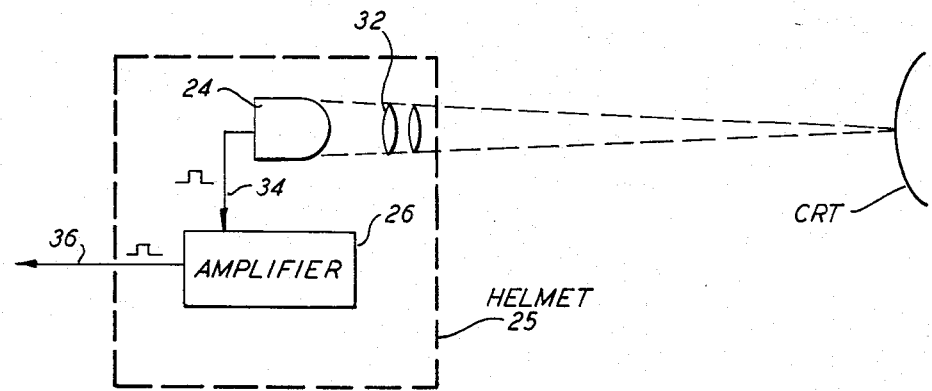
FIG. 6 is a schematic that illustrates the association of a visual system with correction apparatus.

For purposes of illustration of the principles of the present invention in a typical employment in flight simulation, a simulator is shown in FIG. 2 indicated generally by numeral 10.

In the simulator 10 a trainee 12 is placed in a realistically recreated aircraft environment, e.g., a cockpit 14 designed such that the trainee feels he is in and operating an actual aircraft. An important element used to create this realism is a visual system 16 (FIG. 3) which provides the trainee with an out-of-the-window scene 18 which varies with his operation of the flight control system 19 of the simulator, in a manner which corresponds to conditions encountered in actual flight.

The visual system 16, shown schematically in FIG. 3, includes a scene image generation subsystem 20 combined with an image display subsystem 22. In the preferred embodiment of the present invention, the generation subsystem 20 employs a computer image generator (CIG). The CIG includes a main frame computer such as a Perkin-Elmer 8/32, and a data base retained on a conventional disc data storage means.

The CIG receives flight information based on the trainee's operation of the flight control system 19, and uses this information to call up from the data base an appropriate terrain and/or air target display. The CIG inputs this information to the image display subsystem 22. In the preferred embodiment, subsystem 22 includes a conventional cathode ray tube (CRT) which provides the out-of-the-window scene 18. The scene 18 is produced as the electron beam of the CRT creates scanlines as it traces the raster across the viewing surface of the CRT.

The visual system 16 heretofore described has the capability to provide the trainee with an image e.g. a target, that may be associated with a marksmanship scoring device (not shown). Prior art marksmanship scoring devices that may be associated with this visual system have typically functioned by capitalizing on an ideal premise-namely, that if a simulated firearm is properly aimed at the target, an indication of a hit is recorded. Included in this ideal premise is an assumption that the overall system, which includes the image generation subsystem 20, the image display subsystem 22, and the associated scoring device is free from equipment errors.

This ideal premise is challenged however if equipment errors exist anywhere in the overall system; in fact, the premise becomes untenable if equipment errors are not anticipated and corrected by appropriate correction means. As an example, assume that the target is traced ideally by the CRT and is located between columns B and C on line 2, as in FIG. 4A. Because of equipment errors due to, for example, scanline non-linearities, the target appears incorrectly to the trainee between columns B and C and close to line 3. Thus, an "accurate" shot aimed at the latter location is scored as a miss by an ideal scoring device.

The present inventors have discovered an approach that provides for correction of equipment errors that may be due to a variety of reasons and that may arise anywhere in the overall system. The present invention includes a feedback loop that connects the visual system 16 with correction apparatus in such a manner that equipment errors are compensated and correct scoring is provided.

In order to explain the operation of the present invention, "raster space" and "raster time" are first defined. Raster space refers to that aspect of the CRT which defines *where* a target is located on the viewing surface. For example, the grid displays of FIGS. 4A or 4B may be considered to correspond to raster space.

Raster time, on the other hand, refers to that aspect of the CRT which defines *when*, or at what moment of *time*, a target is displayed in raster space. For example, with a master clock that begins counting in synchronization with the movement of the beam that traces the raster across the viewing surface, the target shown in both FIGS. 4A and 4B correspond to a clock count of seven (that is, row 1, columns A through F equals six time counts; row 2, columns A through B equals one more time count, or seven counts altogether).

Using these definitions in combination, it is observed that even with distortions in raster space due to equipment errors, as shown for example by comparing FIGS. 4A and 4B, raster time is independent of and unaffected by raster space distortions (i.e., raster time is seven in both FIGS. 4A and 4B). Moreover, raster space and/or raster time provide alternative and equivalent ways to uniquely specify the location of a target. Therefore, a target that has been distorted due to equipment errors, so that its position in raster space has been changed from its ideal location, may nevertheless be ideally located by specifying its "location" with reference to raster time.

The present inventors have discovered that by capitalizing on the disparate notions of raster space and raster time, the scoring device can compensate for distortions that occur in raster space. Thus, a target in raster space is first referenced to a CIG master clock to generate a target raster time, and then target raster time is compared to an aiming point time also baselined to the master clock of the image generation subsystem 20. If target raster time is the same as the aiming point time a hit is scored and conversely, if target raster time differs from the aiming point time, a miss is scored. It is observed that this approach to scoring compensates for any distortions due to equipment errors.

FIG. 5 is a schematic that illustrates a preferred embodiment of the present invention constructed according to the principles of the present invention. FIG. 5 shows a series connection of the visual system 16 with correction apparatus that includes a photo sensor 24, an amplifier 26, a counter 28, and a comparator 30.

As shown in FIG. 6, the photo sensor 24 is mounted on the trainee's helmet 25 and is focused on the CRT raster of the image display subsystem 22. More specifically, the photo sensor 24 is positioned relative to the helmet in such a manner that it is in correspondence with the trainee's look angle. Appropriate focusing is facilitated by using conventional lenses 32 mounted in front of the photo sensor. The photo sensor may include any conventional photo sensitive device, such as a photo diode or photomultiplier tube, and functions in a manner well known in the art to convert the optical image of a CRT display target into an electronic output pulse. The electronic pulse is in timed correspondence with the beam of the CRT as it traces the raster across the viewing surface.

The electronic pulse is inputted by means of line 34 to a conventional amplifier 26, and the amplified output is fed along line 36 to the conventional digital binary counter 28.

Generally, the function of the counter 28 is to help coordinate the measurement of the CIG master clock time with the electronic pulse which is in correspondence with the timed occurrence of the aiming of the simulated weapon (not shown). The counter thus facilitates the conversion of the aimed location in raster space into an aiming time. To this end, counter 28 accepts four input signals, the electronic pulse along line 36, and signals 38, 40 and 42 which are provided as CIG master clock signals outputs. Counter 28 further provides two output signals 44 and 46 which are fed to the conventional AND gates 45 and 47.

As shown in FIG. 5, signals 44 and 46 enable AND gates 45 and 47 when an electronic pulse is fed along line 39 to the AND gates 45 and 47. This pulse is fired when the trainee pulls the trigger of the simulated weapon. Thus, when the trigger is pulled, signals 44 and 46 are fed to the comparator 30.

The comparator 30 is a conventional binary digital comparator that accepts input signals 44 and 46 from the counter 28 and the input signals 48 and 50 from the CIG. The input signals 48 and 50 provide a time magnitude which corresponds to the target raster time representation of the target. Conventional circuitry (not shown), similiar to that provided above for the counter 28, may also be included so that signals 48 and 50 are fed to comparator 30 when a shot is fired. The comparator 30 thus compares target raster time, provided by signals 48 and 50, with aiming point time provided by signals 44 and 46. If target raster time is the same as aiming point time, a hit is scored; if target raster time differs from aiming point time a miss is scored.

In more detail, and with helpful reference to FIG. 4A, signal 48 supplies the information of the target as transformed from raster space, where it is actually represented by pictures elements or pixels, into target raster time. In particular, signal 48 gives the element number (hence E clock) of the target shown in FIG. 4A. In the same fashion, signal 50 supplies information of the target as transformed from raster space into target raster time. Here, signal 50 gives a line number (hence Horizontal or H sync) of the target.

The counter 28 is stopped (halted) upon receipt of the electronic pulse that is outputted by the photo sensor 24 along line 36. At this point, the magnitude of target raster time as established by the E clock and H sync, is fed to the comparator 30 along lines 48 and 50 respectively. As described above, the magnitude of the aiming point time is also fed to the comparator 30 upon the occurrence of the pulling of the trigger. In particular, signal 44 provides the E clock magnitude component of aiming point time, and, signal 46 provides the H sync component of aiming point time. After the comparator compares target raster time with aiming point time and indicates a hit or miss situation, the counter 28 is reset by signal 42 so that element counting can begin anew (at the end of each field) and so that line counting can begin anew once a shot is fired.

Figure 7:
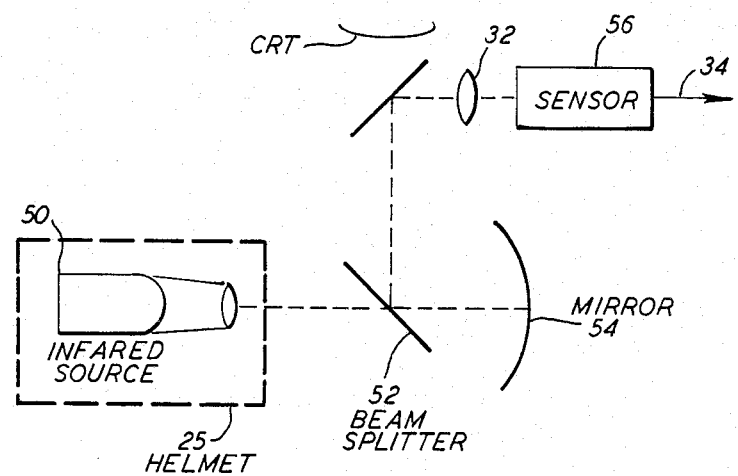
FIG. 7 is a schematic that illustrates an alternative embodiment of the present invention.

In an alternative embodiment of the present invention, shown in FIG. 7, the photo sensor 24 is replaced by conventional apparatus that includes an infrared light source 51 in combination with a beam-splitter 52, a mirror 54 and a sensor 56, such as a charge coupled device or a camera. This embodiment modifies the preferred embodiment by altering, in a manner well-known in the art, the process whereby the aiming point time representation of the target is converted to the electronic pulse inputted on line 34. The alternative embodiment advantageously provides for the correction of equipment errors independent of the image brightness of the CRT display.

The principles of the present invention may be extended to include an embodiment (not shown) which provides means for identifying, by its geometrical or topological properties, an object anywhere in raster space, and then comparing this identification of the object in raster space with the objects provided by the image generation subsystem. If the identity of an image in raster space matches the identity of an image provided by the image generation subsystem, indication of a hit is provided by the scoring device. This embodiment therefore provides an indication of a hit or miss on the basis of the identification of the geometrical properties of a target, and is therefore independent of equipment errors that otherwise lead to incorrect scoring.

Although specific embodiments of the invention have been described herein, it will be obvious to those skilled in the art that various modifications may be made without departing from the spirit of the invention. For example, the image generation subsystem may comprise a camera model board subsystem, and/or the image display subsystem may comprise a video projector and screen. In all cases the scoring of an associated marksmanship device will be accurate, independent of equipment errors that may arise in the generation or display subsystems. With the foregoing in mind, it is understood that the invention is intended to be limited solely by the appended claims.

We claim:

1. In a device to compensate for distortion in target location in a visual system that includes computer image generation of a target for display on a cathode ray tube, the improvement comprising:
   first means to locate grid coordinates for said target as determined by said computer;
   second means, separate from said first means, to locate grid coordinates for an aiming point on said cathode ray tube; said last mentioned grid coordinates measuring the actual location of the aiming point on a distorted display as it appears visually to the user; and
   means to compare the location of said target as determined by said computer with the location of said aiming point on said cathode ray tube to present an indication as to whether there is coincidence.

2. A device to compensate for distortion in target location in a visual system, comprising:
   display means to present a visual target to a trainee;
   computer image generator means to provide information to said display means as to the location of said visual target in accordance with a predetermined grid count and to provide a first signal in response to said grid count;
   separate circuit means, responsive to the predetermined grid count to define an aiming point of said computer image generator means, to generate a second signal also in response to said grid count; said last mentioned grid count measuring the actual location of the aiming point on a distorted display as it appears visually to the user; and
   comparator circuit means to generate one predetermined signal at a point in time, determined by said trainee, when there is coincidence between said first and said second signals and to generate another predetermined signal at another point in time, determined by said trainee, when there is no coincidence between said first and said second signals.

3. A device to compensate for distortion in target location in a visual system as recited in claim 2 wherein said one signal and said another signal generated by said comparator circuit means are predetermined to indicate HIT and MISS, respectively.

4. A device to compensate for distortion in target location in a visual system as recited in claim 3 wherein said display means is in the form of a cathode ray tube to present said visual target to said trainee.

5. A device to compensate for distortion in target location in a visual system as recited in claim 4 wherein said comparator circuit means is a binary digital comparator means.

6. A device to compensate for distortion in target location in a visual system as recited in claim 5 wherein said binary digital comparator means is adapted to compare target raster time with aiming point time, so that said one signal indicates that there is a coincidence between said first and said second signals.

7. A device to compensate for distortion in target location in a visual system as recited in claim 6 wherein said first signal provided by said computer image generator means, responsive to said grid count, corresponds to the target raster time representation of said target on said cathode ray tube, and said second signal provided by said separate circuit means, also responsive to said grid count, corresponds to the aiming point time representation of said visual target as seen by the trainee, whereby when there is coincidence between said target raster time and said aiming point time, said one signal generated by said comparator circuit means is indicative of a HIT, and when there is no coincidence, said another signal is indicative of a MISS.

8. A device to compensate for distortion in target location in a visual system as recited in claim 7 wherein said separate circuit means includes sensor means to initiate the generation of said second signal.

9. A device to compensate for distortion in target location in a visual system as recited in claim 8 wherein said sensor means is in the form of a photosensor means.

10. A device to compensate for distortion in target location in a visual system as recited in claim 9 wherein said photosensor means is helmet mounted.

11. A device to compensate for distortion in target location in a visual system as recited in claim 10 wherein said sensor means is in the form of a charge-coupled device.

12. A device to compensate for distortion in target location in a visual system as recited in claim 11 including infrared light source means to initiate the generation of said second signal independent of target brightness on said cathode ray tube.

13. A device to compensate for distortion in target location in a visual system as recited in claim 8 wherein said sensor means is in the form of a camera to convert aiming point location of said target on said cathode ray tube to initiate the generation of said second signal.

14. A device to compensate for distortion in target location in a visual system as recited in claim 8 including amplifier circuit means connected to the output of said sensor means.

15. A device to compensate for distortion in target location in a visual system as recited in claim 14 including counter means responsive to the predetermined grid count of said computer image generator means and connected to the output of said amplifier circuit means to receive an amplified second signal.

16. A device to compensate for distortion in target location in a visual system as recited in claim 2 including trigger means operable by said trainee to determine said point in time for the comparison between said first and second signals.

17. A device to compensate for distortion in target location in a visual system as recited in claim 16 wherein said separate circuit means includes sensor means to initiate the generation of said second signal.

18. A device to compensate for distortion in target location in a visual system as recited in claim 17 including amplifier circuit means connected to receive a signal from said sensor means.

19. A device to compensate for distortion in target location in a visual system as recited in claim 18 including counter means connected to receive an amplified signal from said sensor means.

20. A device to compensate for distortion in target location in a visual system as recited in claim 19 including AND gate means connected to pass said second signal from said counter means to said comparator circuit means when there is coincidence between the operation of said trigger means by said trainee and the availability of said second signal.

21. A device to compensate for distortion in target location in a visual system as recited in claim 20 wherein said counter means is reset by said computer image generator means at the end of each frame of the image on the cathode ray tube to maintain accuracy of the device at a maximum.

* * * * *